United States Patent
Lindsten et al.

[11] Patent Number: 5,972,284
[45] Date of Patent: Oct. 26, 1999

[54] METHOD FOR THE PRODUCTION OF SOLID SHAPED BODIES

[75] Inventors: Göran Lindsten, Mölndal; Jesper Brandt, Billdal; Elis Carlström; Annika Kristoffersson, both of Göteborg, all of Sweden

[73] Assignee: SKF Nova AB, Göteborg, Sweden

[21] Appl. No.: 08/724,890

[22] Filed: Oct. 3, 1996

[30] Foreign Application Priority Data

Oct. 3, 1995 [SE] Sweden .................................. 9503413

[51] Int. Cl.$^6$ ....................................................... B22F 3/00
[52] U.S. Cl. .................. 419/2; 419/36; 264/44; 264/60; 264/63; 264/414
[58] Field of Search .......................... 419/2, 36; 264/414, 264/60, 63, 44; 501/94, 127, 128, 63, 96

[56] References Cited

U.S. PATENT DOCUMENTS

| | | | |
|---|---|---|---|
| 4,244,898 | 1/1981 | Bandyopadhyay et al. ............... | 264/43 |
| 5,126,082 | 6/1992 | Frank ........................................ | 264/28 |
| 5,279,994 | 1/1994 | Kerkar ...................................... | 501/94 |
| 5,320,157 | 6/1994 | Siak et al. ................................. | 164/12 |
| 5,458,837 | 10/1995 | Roberts et al. ............................ | 264/44 |
| 5,734,959 | 3/1998 | Krebs et al. ............................... | 419/2 |

FOREIGN PATENT DOCUMENTS 0 087 160  8/1983  European Pat. Off. .
93-34829   1/1993  Japan .

OTHER PUBLICATIONS

Derwent Abstract of European Patent Application No. 0 087 160.

English translation of Japanese Patent Application No. 93–34829.

*Primary Examiner*—Ngoclan Mai
*Attorney, Agent, or Firm*—Burns, Doane, Swecker & Mathis, L.L.P.

[57] ABSTRACT

Solid, homogenous or porous, shaped bodies are formed from different powders such as metals and ceramics by preparation of an aqueous slurry of the powder, which slurry comprises a protein substance which is soluble in water at ambient temperatures and capable of forming an irreversible gel on heating to a temperature not exceeding 90° C. The protein substance, for example albumin, is used in an amount sufficient for the formation of a gel. The slurry is formed into a body of the desired shape by methods such as molding, tapecasting or dropforming and heating to a temperature at least corresponding to the gelling temperature of the protein.

13 Claims, No Drawings

METHOD FOR THE PRODUCTION OF SOLID SHAPED BODIES

BACKGROUND OF THE INVENTION

1. Field of the Invention

The present invention relates to a method for forming solid shaped bodies from different inorganic powder materials such as metal powder, ceramic powder, etc. More particularly the invention relates to such a method wherein either homogenous, dense, solid bodies or porous, solid bodies are formed from an aqueous slurry containing the powder and a protein substance which is capable of forming a gel on heating.

2. Description of the Related Art

Several methods are known for forming shaped bodies, both for forming homogenous, dense bodies and porous bodies, from different inorganic powder materials. The simplest wet-forming method for dense bodies is the slipcasting method. As a rule, no binding substance is required for slipcasting and the method is used for fairly simple designs without too great demands on precision, such as sanitary products.

Other forming methods used, for example for the production of technical products and constructional products such as cutting tools, wear parts, threadguides, piezo activators, etc., may require binders to make the green bodies hold together sufficiently to be removed from molds and/or transferred to the next step, which for products of powders of the type considered usually is a sintering at temperatures of from 800° C. to 2200° C., depending inter alia on the melting point of the powder. In addition to a binding agent, the slurry from which the green bodies are formed usually also contains a dispersing agent for the powder. Shaped, porous and foamed, solid bodies have traditionally been prepared by use of an organic preform with foam structure which has been dipped into a powder slurry. The obtained structure has then been dried, the preform burnt off and the product finally sintered. According to more recent technique, use is made of a polymer which reacts with the water in the slurry forming carbon dioxide which leads to foam formation and possible crosslinking. The porous bodies are particularly useful in applications such as heat insulating materials, filters and catalyst supports.

Several different types of binders, such as waxes, synthetic and natural polymers, for example polyvinyl alcohol, ethylene-acrylic acid copolymers and cellulose derivatives such as methyl cellulose and hydroxyethyl cellulose, have been suggested and used to strengthen green bodies. It is also known to form green bodies using gel forming substances, for example agarose, which forms a gel on cooling, or a synthetic monomer or monomer mixture, e.g. of mono- and difunctional acrylamides and of di- and multifunctional acrylates, which polymerizes and crosslinks on heating, to form a polymer gel matrix in which the powder is distributed. Further, the use of some proteinaceous substances for the formation of green bodies is known. Some protein substances, such as gelatin and casein, have been used or suggested for use as a conventional binder material in aqueous solution.

In the European patent application 0 087 160 the use of a "gelling agent" and of a "stabilizing agent" in the preparation of porous, metallic bodies is disclosed. According to this application, a "gelling agent" which is carboxymethyl cellulose, polyvinyl pyrrolidone, polyvinyl alcohol, albumin or agar is used, and its presence is said to be necessary so that the foam structure is not destroyed when the metal powder is introduced. However, in order to solidify the foam structure a "stabilizing agent", preferably a polyurethane, formed from monomers incorporated in the foam is necessary. In this process the so called gelling agents are consequently only used for foam formation while the actual formation of a rigid gel is obtained by the polyurethane.

Gelatin has also been suggested for use as a gel former. Thus, U.S. Pat. No. 5,279,994 discloses a process for tapecasting using gelatin for gel formation. The use of gelatin for this purpose necessitates heating the entire slurry to dissolve the gelatin and cooling for setting it into a gel.

The Japanese patent application 94-226718 likewise discloses use of gelatin for its gel forming properties. According to this document a body is formed by casting a powder slurry containing the gelatin, dissolved by heating, into a mold and cooling for gelation. It is mentioned in the document that other proteins could be used, e.g. albumin, but the disclosed process in itself is strictly one using heating for dissolution of the protein and cooling for the gelation, i.e., conditions which are required for gelating but would not necessarily be gel-forming conditions for other protein materials.

Gel formation using synthetic polymers is often disadvantageous in that fairly high temperatures are required for formation of a polymer matrix and also in that fairly high temperatures are required for removal of the organic substance. Use of gelatin as a gel former has drawbacks in that the gel formation is reversible and in that heating of the entire slurry is required which involves a high energy consumption. Further, gelatin leads to a thickening of the slurry which causes difficulties in handling.

SUMMARY OF THE INVENTION

The present invention provides a method for forming solid, homogenous or porous, shaped bodies from a powder. The powder may be reinforced and is selected from among powders of metals, intermetals, cermets and/or ceramics. The method comprises preparing an aqueous slurry of the powder and a protein substance which is soluble in water at ambient temperatures and capable of forming an irreversible gel on heating to a temperature not exceeding 90° C., the amount of the protein substance being sufficient for the formation of a gel. The slurry is then formed into a body of the desired shape by molding, tapecasting or dropforming, and heating to a temperature at least corresponding to the gelling temperature of the protein.

According to the present invention, it has been found that incorporation of a water-soluble protein substance which forms an irreversible gel on heating in a powder slurry as starting material for formation of shaped solid bodies is particularly suitable. The protein substance used in the present method has a gel forming temperature, or coagulation temperature, which does not exceed 90° C. The lower limit for the gel forming temperature should be sufficiently removed from room temperature to allow easy handling without coagulation. The gel forming temperature is suitably within the range of from 40° C. to 70° C.

By gelling the slurry with the protein substance, the powder particles will be held together uniformly distributed in the gel and the shape of the produced body will be satisfactorily secured and have sufficient wet strength to allow further handling and treatment without unacceptable deformation. Use of this kind of protein gives advantages not only in that an irreversible gel is formed but also in that the slurry can be prepared at ambient temperatures (around 20° C.–25° C.) and gelation brought about by heating to moderately high temperatures. Thus there is no need to heat the entire slurry but instead the slurry is heated in the molds or in other formed states, which is advantageous with regard to energy consumption. Since only moderately high temperatures are used for the gelation the risk of evaporation of water, which otherwise might lead to defects, is also avoided.

Further, the protein will act not only as a gel former but also as a dispersing agent, whereby the conventional use of separate dispersing agents can be avoided. It is believed that the structure of a globular protein such as albumin is utilized in the dispersing effect.

The protein substance can, for example, be albumin from any of its different sources such as milk and egg, but other globular proteins having the required solution-coagulation properties may be used. An example is lysozyme. Examples of protein substances containing substantial amounts of protein and suitable for use in the present method include blood plasma protein products and whey protein products. Commercial products of this kind contain major amounts of protein and minor amounts of other materials such as fat. For economical reasons, with respect to the field within which it is used according to the present invention, the preferred protein is albumin. It is, however, very probable that other proteins having the appropriate properties may become available at reasonable prices with regard to the technical advances made within the field of biochemistry in the last few years.

By "protein substance" is intended either a protein as such or a material comprising a protein, for example blood plasma protein and whey protein products as mentioned above. The demands on the protein substance is that the protein is soluble at ambient temperatures and gels at a temperature below 90° C. Since the proteins used according to the invention are water soluble, natural materials and biologically degradable, their use does not cause any environmental or occupational hazards.

The present invention thus relates to a method for forming solid, homogenous or porous, bodies from an, optionally reinforced, inorganic powder selected from among powders of metals, intermetals, hard metals, cermets and/or ceramics.

The powder used in the present method is a powder of a metal, an intermetallic powder, a hard metal powder, a cermet powder or a ceramic powder. The term "metal" is herein used to include also alloys. Examples of metal powders include for example powders of aluminum, nickel, copper, cobalt, titanium, silicon, brass and bronze. Intermetallic powders are for example silicides and aluminides, such as for example molybdenum silicide. Powders of hard metals (cemented carbides) are powders of different kinds of carbides such as wolfram carbide and titanium carbide. By the term "ceramic" as used in this specification is meant a non-metallic, inorganic material. The powder of ceramic powder may for example be any metal oxide, such as silicon oxide, aluminum oxide, yttrium oxide and zirconium oxide, nitrides such as silicon nitride, aluminum nitride and boron nitride, and may also be titanium boride, silicon carbide, boron carbide and mullite (i.e. $Al_6Si_2O_3$).

Particularly suitable powders for use in the present method for forming dense bodies are silicon nitride, sialones (i.e. powders made up from the elements Si, Al, O and N), aluminum oxides and silicon carbide. For porous bodies the preferred powders are aluminum oxide, aluminum titanate, silicon carbide, zirconium oxide and cordeirite ($2MgO.2Al_2O_5.5SiO_2$).

It is of course within the scope of the invention to use any mixture of powders, although a single kind of powder or a well defined mixture, in which the individual particles may have reacted with each other, is used for the production of most products. Although it is preferred that the method of the present invention is applied to powder materials which are not reinforced, it is of course possible to apply the method to reinforced ceramic materials which are thus also within the scope of the invention. Such ceramic matrix composites may for example comprise conventional reinforcing materials in the form of whiskers, fibers, particles and platelets, in usually used amounts.

The powders for the preparation of the slurry usually have a particle size within a broad range of from 1 nm to 1 mm. The actual powder size is to a high degree decided by the method of sintering, smaller particles being more easy to sinter while larger particles will require hot pressing or hot isostatic pressing. Further, very small particles result in a very viscous slurry. For ceramic powders a particle size range of from 0.1 $\mu$m to 100 $\mu$m is of particular technical interest and the corresponding particle size range for metal powders and metal alloy powders is from 1 $\mu$m to 300 $\mu$m.

The actual preparation of the slurry may be carried out by simple mixing of a water solution of the protein substance and the inorganic powder, dry or in water, or the protein substance can be added dry to a slurry of the powder. The protein substance is usually used in an amount of at least 3 wt %, calculated as protein, and based on the aqueous phase, to get a body of sufficient dimensional stability. Usually not more than 20 wt % is used, since higher amounts tend to give a too viscous slurry. The added amount is also dependent on the effective area of the powder. A suitable range of the amount of protein is from 10 to 15 wt %, based on the aqueous phase.

The dry contents of powder in the slurry is normally from 20 to 90 percent by volume, in most cases from 30 to 70%. The higher dry contents can be used for powders having larger particle size, i.e. smaller surface, and/or broader particle size distribution without giving rise to an unacceptable viscosity increase. The dry contents is also to some extent dependent on the forming method. Simple agitation, e.g. by means of a propeller or similar agitation equipment, is often sufficient for the preparation of the slurry. If agglomerates are present in the powder high energy treatment might be required, e.g. ball milling or ultrasound treatment. It has been found that even if the slurry is subjected to a high energy treatment, e.g. ball milling, for a fairly long time period, this does not adversely affect the coagulation capability of the protein.

For the production of homogenous, dense bodies, it is usually necessary to include an antifoaming agent in the slurry in order to prevent foam forming when air is dispersed into the slurry. Examples of suitable antifoaming agents are fatty alcohols, such as octanol, and silicon oils. The amount of antifoaming agent is usually at least 0.1 wt %, based on the aqueous phase.

For the production of foamed, porous bodies the foam forming properties of the protein substance are used, as well as their capability of forming a gel. In this case the protein is allowed to form a foam by agitation for incorporation of air and, naturally, no antifoaming agent is used. The final porosity can be controlled within the desired ranges, e.g., by the degree of agitation. The size of the pores can be very fine, 20 to 1000 $\mu$m. It has been found that the formed foam is stable and has a high foam height. The foam can easily be filled into molds of varying shapes and sizes.

Conventional additives in commonly used amounts can be incorporated in the slurry, such as for example mold release agents, biocides, and lubricants, provided, of course, that they do not have an adverse effect on the coagulation of the protein. A conventional dispersing agent for inorganic powders, for example polyacrylic acid, may also be included. However, it is an advantage of the method of the present invention that addition of a separate dispersing agent is generally not required since the protein substance used for the gel formation also fulfils the function of a dispersing agent. The fact that additional dispersing agent is not required means that less organic material has to be removed from the green body. The function of the protein substance is such that no other binding substance and/or gel forming agent is necessary, and according to a preferred embodiment of the present invention no such addition is made. Furthermore, to take most advantage of the properties of the protein substance no additional dispersion agent is used and the load of organic substances in the slurry is thus minimized. Competitive adsorption of binding agent on the powder resulting in destabilization is also avoided by use of the protein substance as both dispersion agent and "binding agent" according to the invention.

In the present method of forming a solid body, whether dense or porous, any per se known wet-method technique for forming from a slurry or suspension can be utilized. Products can thus be formed according to the present invention by any molding or casting process, for example by injection molding and gelling or casting and gelling. It is also possible to use tapecasting, techniques and dropforming techniques. In tapecasting, the slurry containing the gel forming protein can be casted onto a support sheet and gelling achieved by heating the association of support sheet and slurry layer. In dropforming techniques, substantially spherical drops, or beads, are formed for example by dropping the slurry containing the protein into a column filled with a solvent which is not a solvent for the slurry, for example a heated silicon oil, whereby the drops are gelled when heated.

The preferred forming methods are injection molding-gelling and casting-gelling. The latter method is particularly preferred and can be used for forming near net-shaped products, i.e. green bodies having substantially the same shape as the finished sintered product will have. Injection molding-gelling is particularly suitable for the production of articles of complex shapes such as for example nozzles, wear parts, turbo-charger rotors and medical implants, and casting-gelling is particularly suitable for the production of porous bodies.

The term "shaped body" herein is thus intended to include products of a simple shape, such as tapes and beads, as well as products of a more complicated shape.

The green bodies produced according to the present method are dried to remove the water and treated for removal of the protein and optional other organic substances. This removal can be made in a separate step or form an early part of the final sintering process. The actual removal of the protein is rapid since the bodies contain very little protein in comparison with the amount of powder material. Thus heating at 500° C. to 600° C. for about 30 minutes in air is most often sufficient for removal of all the protein.

For the formation of a solid, dense body the green body is sintered. Sintering temperatures, times and other conditions for different powder materials are well known in the art of powder materials. Depending on the powder material the sintering is carried out in air, e.g for $Al_2O_3$, or, most often, in a protective atmosphere such as a nitrogen atmosphere, e.g. for $Si_3N_4$, and the protecting atmosphere may be reducing. As known, sintering can be carried out under normal or reduced pressure. For example, $Al_2O_3$ is usually sintered in air at a temperature of around 1600° C. for 1 to 2 hours, $Si_3N_4$ is usually sintered at 1850° C. under nitrogen for around 2 hours, while SiC can be sintered at a temperature of about 2100° C. under argon for 1 hour and stainless steel at 1200–1250° C. under vacuum for about 2 hours. The finished sintered body can be machined as conventional.

The invention is further illustrated in the following examples which, however, are not intended to limit the same. Parts and percent relate to parts by weight and per cent by weight unless otherwise stated.

DESCRIPTION OF PREFERRED EMBODIMENTS

EXAMPLE 1

In this example dense bodies were prepared. A powder mixture consisting of 92% of $Si_3N_4$ (S85H, from Permascand AB, Sweden), 6% of $Y_2O_3$ and 2% of $Al_2O_3$, having a particle size of 0.1–2 µm, was added to a water solution of 10% of bovine albumin (A4503 from Sigma, Delaware) until a dry contents of powder of 32 vol % was reached. 0.1%, calculated on the aqueous phase, of an antifoaming agent (Kontraspum Konz., a fatty alcohol, from Zschimmer & Schwarz, Germany) was added. The slurry was milled using a ball mill with $Si_3N_4$-balls for homogenization and de-agglomeration. The slurry was then deaired while agitating and poured into small molds which were then covered with plastic film. The molds were warmed to 65° C. for coagulation of the protein and then quickly cooled to room temperature. The obtained dimensionally stable green bodies could easily be removed from the molds. After drying at room temperature the protein in the bodies was burnt off in air at 600° C. during 5 minutes. The powder bodies were sintered to dense bodies in a resistance furnace made of graphite at 1820° C. for 3 hours under nitrogen and at atmospheric pressure.

EXAMPLE 2

A dense body was produced by adding 56 g of $Al_2O_3$-powder (Alcoa 152SG) to 29.3 g of a water solution containing 10 percent by weight of egg white protein during careful propeller stirring. Using a pipette, the obtained slurry was dropped into a column filled with silicone oil heated to 80° C. After a short while the drops coagulated and became solid. They retained their stiffness and were not deformed when they were picked out from the oil bath. To lower the viscosity of the original slurry a small amount of water was added, about 5 g. Drops from this slurry also became solid in the silicon oil. All drops were burnt off in air at 600° C. with a heating rate of 5° C./min. and sintered at 1600° C. in air for 60 minutes.

EXAMPLE 3

In this example porous bodies were prepared. $Al_2O_3$-powder having a mean particle size of 0.4 µm was first dispersed in water using 0.3 wt % of a dispersing agent (Dispex A40, a polyacrylic acid from Allied Colloids, U.S.A.) by means of ball milling. The dry contents of the slurry was 37 vol %. 15 wt %, based on the aqueous phase, of the same bovine albumin protein as used in example 1 was then added while the slurry was agitated by a magnet at 1000 rpm for 5 minutes. A stable foam was formed when air was mixed into the slurry during the vigorous agitation. The slurry was then poured into small molds made of aluminum foil, and the molds were covered with aluminum foil. The molds were placed in a drying chamber at a temperature of 60° C. to 70° C. to allow gel formation. The gelled structures were dried and then sintered at 1500° C. for 30 minutes using a heating rate of 1° C./min up to 500° C. and then 10° C./min up to the maximum temperature.

The obtained sintered, porous bodies had a density of 0.57 g/cm$^3$, which corresponds to a theoretical density of about 15% considering the $Al_2O_3$-bulk as having a density of 3.90 g/cm$^3$.

EXAMPLE 4

In this example porous stainless steel bodies were produced using protein as a foaming agent. Stainless steel powder (316L, 90%<22 μm, Osprey Metals Ltd, U.S.A.), corresponding to a solid content of 33.8 vol %, was added to a water based solution of 13.0 wt % bovine albumin (A-4503, SIGMA Chemical Co., U.S.A.) during stirring. The slurry was then foamed by high speed stirring for 5 minutes, which doubled the volume. To avoid sedimentation due to the high density of the steel powder (8.0 g/cm$^3$), the slurry had to be thickened. This was done by lowering the pH from 5.2 to 2.6 by adding diluted HCl to the slurry during stirring. The foamed slurry was poured into molds and gelled at 70° C. There were no indications of sedimentation or segregation of the gelled bodies. The pore volume was measured to approximately 80%.

EXAMPLE 5

In this example the dispersing effect of bovine albumin was compared to that of gelatin and agarose.

Three $Si_3N_4$-slurries with solid contents of 20 vol % were prepared by mixing $Si_3N_4$ powder (UBE-E10-UBE Industries, Japan) in beakers of distilled water during propeller stirring. After two hours of stirring, the viscosity was measured with a rheometer from StressTech, Sweden, at a shear rate of 100 s$^{-1}$. For one of the slurries the viscosity was measured at 25° C. (processing temperature for bovine albumin) and for the other two at 45° C. (chosen processing temperatures for gelatin and agarose). Both gelatin and agarose form gels at temperatures below 40° C. Bovine albumin (A-4503, SIGMA Chemical Co., U.S.A.) was gradually admixed to the "25° C."-slurry and the viscosity was measured (at 25° C.) after each addition. Gelatin (powder, food additive) and agarose (A-0169, SIGMA Chemical Co., U.S.A.) were added to the other slurries at room temperature. To dissolve the additives entirely, these two slurries were heated to 95° C., and then cooled to 45° C. The solid contents were adjusted to 20 vol %, and the viscosity was measured at 45° C. The viscosity measurements gave the following results:

Slurry without addition: ≈150 mPa.s.

Slurry with gelatin: 1350 mPa.s at an addition of 0.25 wt % gelatin, calculated on the aqueous phase.

Slurry with agarose: 381 mPa.s at an addition of 0.25 wt %, calculated on the aqueous phase.

Slurry with albumin: 139 mPa.s at an addition of 0.25 wt %, calculated on the aqueous phase. The viscosity fell at higher additions and was 49.8 mPa.s at an addition of 2 wt %.

Although preferred embodiments of the invention have been described above, it will be appreciated that many modifications and variations of the present invention are possible in light of the above teachings and within the purview of the appended claims without departing from the spirit and intended scope of the invention.

What is claimed is:

1. A method for forming solid, homogenous or porous, shaped bodies from a powder selected from the group consisting of powders of metals, intermetals, hard metals, cermets, ceramics, and mixtures thereof, comprising:

a) preparing an aqueous slurry of the powder, the slurry further comprising a protein substance which is soluble in water at ambient temperatures and capable of forming an irreversible gel on heating to a temperature not exceeding 90° C., the amount of the protein substance being sufficient for the formation of a gel;

b) forming said slurry into a body of the desired shape by molding, tapecasting or dropforming; and c) heating to a temperature at least corresponding to the gelling temperature of the protein.

2. A method for forming solid bodies according to claim 1, wherein the bodies are homogenous, dense bodies.

3. A method for forming solid bodies according to claim 1, wherein the bodies are porous.

4. A method according to claim 1, wherein the protein substance is a globular protein.

5. A method according to claim 4, wherein the protein substance is an albumin.

6. A method according to claim 1, wherein the protein substance is used in an amount of at least 3 percent by weight of protein based on the aqueous phase.

7. A method according to claim 1, wherein the dry contents of powder material in the slurry is from 20 to 90 percent by volume.

8. A method according to claim 2, wherein the powder is selected from the group consisting of powders of silicon nitride, sialones, aluminum oxides and silicon carbide.

9. A method according to claim 3, wherein the powder is selected from the group consisting of powders of aluminum oxide, aluminum titanate, silicon carbide, zirconium oxide and cordeirite.

10. A method according to claim 3, wherein the slurry does not contain any additional binding agent and/or gel forming agent.

11. A method according to claim 1, wherein the forming of the body is carried out by casting and gelling.

12. A method according to claim 1, wherein the bodies formed by gelation are further treated by drying and sintering, with removal of the protein substance and optionally other organic materials either as a separate step before sintering or as part of the sintering.

13. A method according to claim 1, wherein the powder is reinforced.

* * * * *